Figure 1:
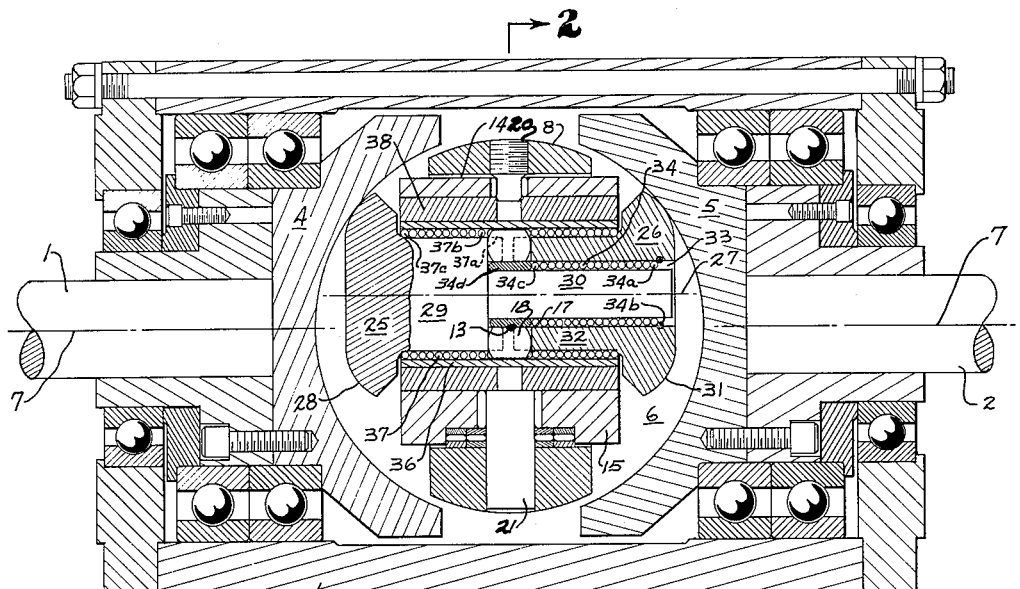

July 19, 1966        C. E. KRAUS        3,261,220

MOTION TRANSMITTING DEVICE

Filed April 25, 1962        3 Sheets-Sheet 1

INVENTOR.
CHARLES E. KRAUS

July 19, 1966  C. E. KRAUS  3,261,220

MOTION TRANSMITTING DEVICE

Filed April 25, 1962  3 Sheets-Sheet 2

INVENTOR.
CHARLES E. KRAUS

July 19, 1966 C. E. KRAUS 3,261,220
MOTION TRANSMITTING DEVICE
Filed April 25, 1962 3 Sheets-Sheet 3

INVENTOR.
CHARLES E. KRAUS

United States Patent Office 3,261,220
Patented July 19, 1966

3,261,220
MOTION TRANSMITTING DEVICE
Charles E. Kraus, Franklin Lakes, N.J., assignor to
Excelermatic, Inc., a corporation of New York
Filed Apr. 25, 1962, Ser. No. 190,086
24 Claims. (Cl. 74—200)

This invention relates to motion transmitting devices, and more particularly to speed changing power transmission devices.

The improvements described and claimed herein are particularly useful in devices of the type disclosed and claimed in my copending application Serial No. 132,985, filed August 1, 1961, and assigned to the same assignee as the present application.

In order to enable adjustment of the speed ratio of spool type traction drives such as shown therein, some form of control means is necessary. Simple control levers and suitable gearing or cylinder assistance are adequate and practical for devices which are normally subjected to relatively light loads. If loads beyond certain limits are applied, excessive effort may be required to move the control to adjust the ratio and surface damage to traction contacts is possible.

A control system employing a spool carrier mounted in eccentric cradles was also disclosed in the above-identified application. With this system, rotation of the eccentrics causes the spool axis to tilt to a position causing precession and ratio change. This system is practical if some form of external sensing means or control feed back is used to return the eccentrics to a non-precessing position when the desired ratio is obtained. With this arrangement, it is possible to encounter hunting under some conditions.

The device disclosed in the above-identified copending application comprises driving and driven discs. A spool-like member for transmitting motion between the discs comprises a pair of axially aligned members which transmit torque from one to the other through cam rollers disposed between the adjacent ends, the latter being shaped to provide cam surfaces. The tangential force originating at the traction contact as the result of either input or output torque generates a proportional tangential force on the cam radius and cam action develops a relatively heavy axial force. This force has components normal to the tangent at the traction point and radial to the spool axis. A twisting couple results which tends to load the bearings within which the spool members rotate in such a way as to cause axial movement thereof and, on occasion, to jam a roller and stall the drive. If the axial force built up as a function of cam action is restricted by bearing friction forces between the spool members and the surrounding bearings which tend to resist the desired axial movement or by any tendency to move both input and output rollers axially toward the input disc, the output disc may unload and allow slip. Hence, it is essential that the assembly be designed so that the tangential forces can be handled without adversely affecting operation of the device.

It is an object of this invention to provide an improved speed changer or power transmission.

It is a second object of this invention to provide improved means for obtaining precessing tilt in power transmission devices.

It is a third object to provide a torque responsive control in power transmissions whereby an increase in load effects a reduction of ratio at a predetermined rate by inherent design characteristics or through adjustable means.

It is a further object to provide, in a speed transmission, control means which can be locked in a fixed, preselected ratio for close speed regulation.

It is a still further object to provide, in devices of the type illustrated herein, means whereby the amount of tilt or movement of the spool axis, which causes the drive to precess to another ratio, is a direct function of the difference between the actual ratio and the desired or set ratio.

It is yet another object of this invention to provide in a device of type described herein improved antifriction means for both axial and rotational movement of the traction rollers.

Another object is to provide antifriction means which insures that the two traction rollers rotate on a common axis.

Another object is to provide antifriction means of increased life in devices of the type described.

Still another object is to provide, in devices of the type described, an antifriction means which is simple and inexpensive to manufacture.

Further objects are to provide a power transmission control which is simple, rugged and inexpensive to manufacture, and which is easily adapted to a variety of remote electrical, hydraulic, or other controls used for automatic or feed back control in process or specialized applications.

Figure 2:
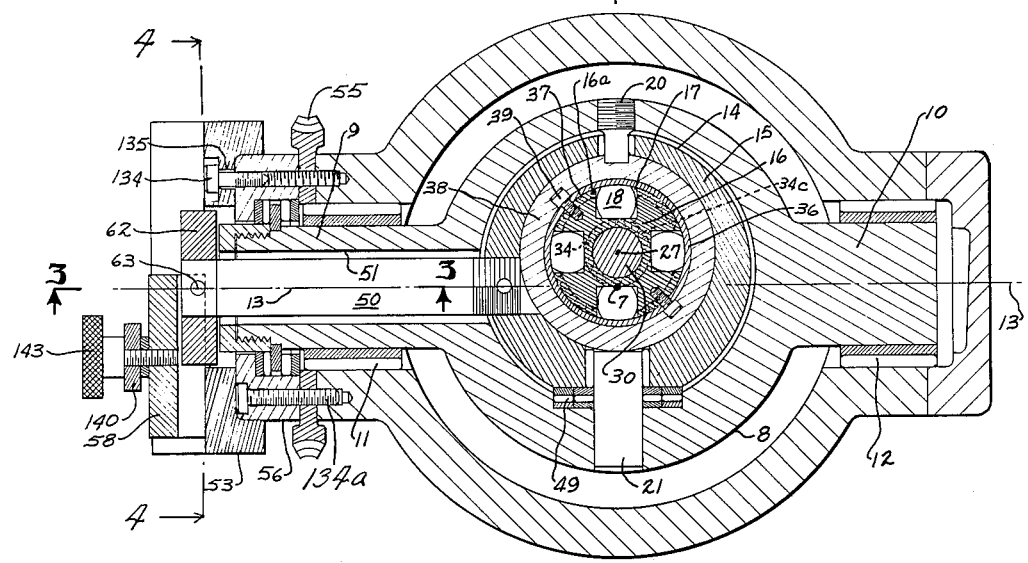
Figure 3:
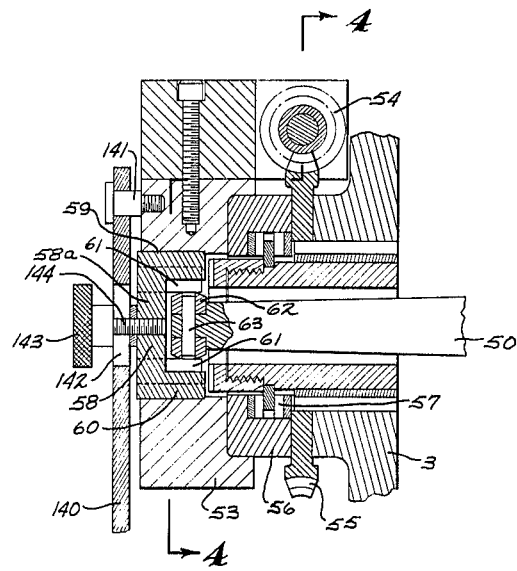
Figure 4:
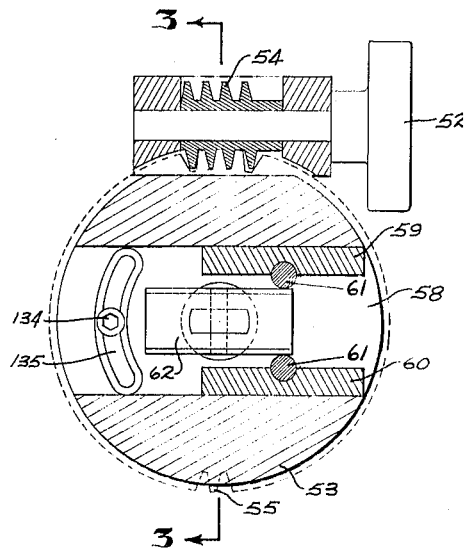
Figure 5:
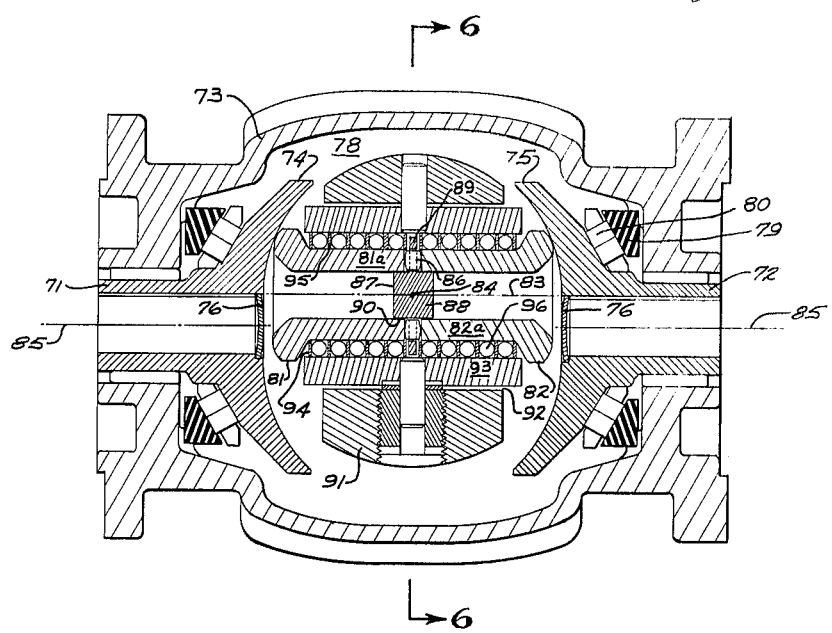

My invention, together with other objects and advantages, will be best understood from the accompanying drawings and description wherein FIGURE 1 is a longitudinal cross-section of a speed changing device taken along the line 1—1 of FIGURE 2, FIGURE 2 is a cross sectional view of the device shown in FIGURE 1, taken along the line 2—2 of that figure, FIGURES 3 and 4 are detailed views of the control means illustrated partially in FIGURE 2, FIGURE 3 being taken along the lines 3—3 of FIGURES 2 and 4, and FIGURE 4 being taken along the line 4—4 of FIGURE 3, and FIGURES 5-8, inclusive, illustrate an alternate embodiment.

Referring to the drawings, there is shown in FIG. 1, a power transmission or speed changing device having an input shaft 1 and an output shaft 2 disposed in axial alignment and suitably journalled for rotation through casing 3. The inner, adjacent ends of shafts 1 and 2 carry oppositely disposed rotatable motion transmitting members shown as generally concave driving disc 4 and driven disc 5, respectively. The discs are axially aligned and preferably shaped so that their adjacent concave surfaces define a substantially spherical cavity 6 concentric with the axis 7 of the device.

In order to transmit rotation of shaft 1 to shaft 2, there is provided a spool carrier 8 which is pivotally mounted within cavity 6 by means of pivot members 9 and 10 (see FIG. 2) supported within suitable sleeve bearings 11 and 12, respectively. The spool carrier is thus disposed for pivotal movement about axis 13 which intersects and is normal to the longitudinal axis 7 along which the shafts 1 and 2 rotate.

Carrier 8 is bored to provide an eccentrically disposed opening 14 entirely through the carrier. Within opening 14, there is disposed an eccentric sleeve member 15 held against rotation in the plane of FIGURE 2 by member 20 and a stud 21 extends through aligned openings in carrier 8 and member 20. Within sleeve 15 there is supported a cage 16 having openings 17 to receive solid force transmitting members, shown as generally barrel shaped rollers 18.

The carrier 8 also embodies a pair of axially aligned spool-like members 25 and 26 mounted for independent rotation about axis 27. Spool axis 27 is displaced from major axis 7 and carrier axis 13.

Spool member 25 has an outer disc engaging portion, 28, hereinafter called a "roller," an intermediate portion 29, and an inwardly extending body portion or shaft 30 of reduced cross-section extending the full width of the carrier. Spool member 26 has an outer disc engaging portion 31, hereafter referred to as a "roller," and an inwardly extending body portion 32. Member 26 has an axially extending opening 33 for receiving shaft 30 whereby shaft 30 and portion 32 are arranged in telescopic relation. The parts are so dimensioned that portions 30 and 32 are spaced apart. In order that members 25 and 26 may rotate with respect to each other in a substantially friction free manner, the space between portions 30 and 32 is filled with roller bearings 34. These roller bearings are preferably hardened steel balls and of such number as to fairly fill the cavity but yet permit freedom of both axial and rotary movement. The illustrated assembly of shaft 30, portion 32 and balls 34 insures axial alignment of rollers 28 and 31 and prevents uneven load distribution on the roller assembly. In order to retain balls 34 in place, there is provided at the outer end a rubber O ring 34a and retainer ring 34b and at the other end a rubber O ring 34c backed up by the rim 34d of cage 16.

As explained in the above-identified application, the adjacent inner ends of portions 29 and 32 are provided with cam faces (not shown) whereby an axial force is transferred from member 25 to member 26 through rollers 18 which tends to separate the members and press them against the faces of discs 4 and 5, respectively, in proportion to the tangential force applied to member 25 by the input disc.

The spool assembly including members 25 and 26 is mounted within a sleeve 36 with the circumferential space between it and portions 29 and 32 filled with hardened balls 37. Again, complete axial freedom is provided. Sleeve 36 is journalled on antifriction bearing 38. The outer rim 37a of cage 16 serves to retain balls 37 in place at the inner ends and the rollers 28 and 31 adjacent portions 29 and 32, respectively, serve as retainers at the other ends of the assembly. Rubber "O" rings 27b and 37c are placed between rim 37a and balls 37, and between the balls and rollers 28 and 31, respectively.

In order to prevent uncontrolled spinning on the balls, fastening means such as screws 39 may be assembled through sleeve 36 into the cam roller cage 16.

Means is provided for varying the speed ratio between input shaft 1 and output shaft 2. When axis 27 lies in the plane of FIG. 1, no steering or precessing tilt is involved. By tilting or causing carrier 8 to pivot about axis 13, one roller is steered up and the other down (as viewed in FIG. 1), thereby changing the drive or speed ratio. The more tilt or rotation applied, the faster is the precessing movement. There are provided antifriction bearings 49 to receive the downwardly directed traction forces on sleeve 15 (as viewed in FIG. 1).

In order to accomplish the tilt or precess movement of the sleeve 15, there is provided an arm 50 which extends through opening 51 in the pivot member 9 which may be in the form of a hollow trunnion, as shown, into suitable engagement with sleeve 15. This may be a threaded connection, as shown. FIGS. 3 and 4 shows in detail how arm 50 may be moved. Very little rotational movement of the arm and, therefore, very little tilt of sleeve 15 is required for rapid ratio change. The means shown herein enables manual adjustment by knob 52 which rotates a slide carrier 53 through a worm 54 operating on a worm gear 55 which is clamped against casing 3 by a suitable cap 56 and bolts 134a. The cap also clamps a two-direction thrust bearing 57 which aids in positioning the carrier 8. To permit relative movement between cap 56 and slide carrier 53, each shouldered bolt 134 extends through an arcuate slot 135 in carrier 53.

Carried in the rotatable slide carrier 53 is a slide member 58 having a base portion 58a and arm portions 59 and 60. The inner faces of the arm portions are recessed to receive pins 61 which, in turn, embrace cross-arm 62 carried on the outer end of arm 50 as by a pin 63.

Clockwise rotation of slide carrier 53 (as viewed in FIG. 4), with slide 58 in the position shown, causes the slide (and, hence cross-arm 62 and arm 50) to rotate also. Assuming that disc 4 is rotating in the proper direction, the carrier 8 will pivot and cross-arm 62 will return to the non-precess position.

If the direv is rotated in the opposite direction, the movements described above are reversed and slide member 58 must be moved to the left in FIG. 4 so as to engage cross-arm 62 (through pins or projections 61) on the opposite side of center while pins 61 are shown, there may be substituted any comparable form of projection from arms 59 and 60.

Means is provided for shifting member 58 from the position shown in FIG. 4 toward the left. For this purpose, I provide a shift lever 140 pivotally attached to slide carrier 53, as by a pivot pin 141. The lever is provided with an opening 142 for receiving locking means comprising locking knob 143 and threaded shank 144 which extends into slide member 58. With knob 143 in non-locking position, pivotal movement of the lever causes member 58 to move laterally as viewed in FIG. 4. The locking knob provides means for selectively preventing rotation of the cross-arm 62 and is particularly useful in preventing accidental movement of lever 140.

Each drive ratio corresponds to a rotated position of the slide carrier 53 and may be set by knob 52. If desired, means may be provided for locking the cross-arm 62 and the carrier trunnion in a fixed position so that the speed ratio is fixed and precession is not possible.

The tangential driving force applied to roller 25 is equal and opposite in direction to that felt by roller 26. The two tangential forces constitute a force couple or moment on sleeve 15 which is transmitted directly to cross-arm 62. By making arm 50 or cross-arm 62 yieldable (not shown) as a function of force magnitude, precess movement is caused in response to load and some torque response results.

A second embodiment of a power transmission or speed changing device is shown in FIGS. 5–8. There is shown an input disc 74 and an output disc 75 having suitable projections 71 and 72, respectively, which are suitably journalled in opposite ends of a housing 73. Shafts, not shown, may be keyed in suitable holes in the discs, the inner ends thereof being closed by suitable plugs 76. In order to provide for load equalization, there are provided mounting pads 79 which carry short, cylindrical rollers 80. The discs are coaxially aligned for rotation about axis 85 as in the first-described embodiment. Again, there is provided a spool carrier assembly 78 generally similar to that described above.

Carrier 78 is pivotally mounted within housing 73 for pivotal movement about axis 84 by means of sets of needle bearings 132 and 133. The carrier is prevented from rotation in the plane of FIG. 6 by studs 21a and 21b.

Carrier 78 also comprises rollers 81 and 82 mounted for rotation on axis of rotation 83, this axis and the pivot axis 84 intersecting as shown. These axes or centerlines are both displaced from axis 85 (upwardly in FIG. 5). The center of curvature for discs 74 and 75 coincides with the above-mentioned intersection.

The adjacent ends of rollers 81 and 82 are provided with cam surfaces (not shown) and are separated by a plurality of force-transmitting cam rollers 86, maintained in place by a cage member 87. The cage member has a body portion 88 extending into the cylindrical openings in roller body portions 81a and 82a. An outwardly extending portion 89 is provided with roller-receiving openings. The shoulders 90 of portion 88 provide support for the inner ends of the rollers.

The carrier comprises a body portion 91 having an opening 92 extending therethrough. Disposed within this opening is a cylindrical element or sleeve 93 which is bored concentrically to provide an opening 94 into which roller body portions 81a and 82a project.

In order to provide substantially friction-free rotation of the rollers, there is provided between sleeve 93 and portions 81a and 82a a suitable cage 95 provided with helically disposed channels containing hardened balls 96, so that the balls do not track on common paths.

From the foregoing description, it will be seen that cage 87 and balls 96 provide support for the rollers which insures exact axial alignment with minimum rotational and longitudinal friction so that the rollers are free to rotate independently about a common axis and are free to move axially under varying load conditions with minimum friction and equalized forces.

Figure 6:
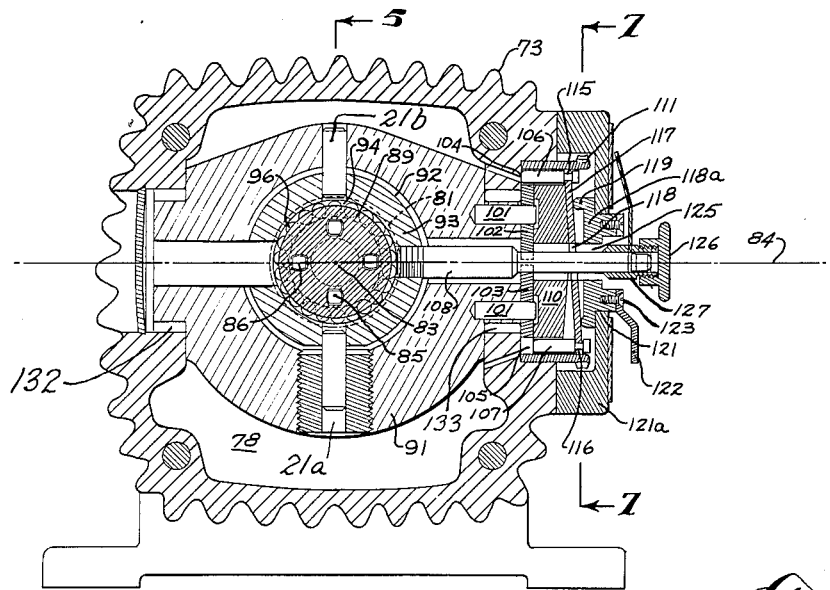
Figure 7:
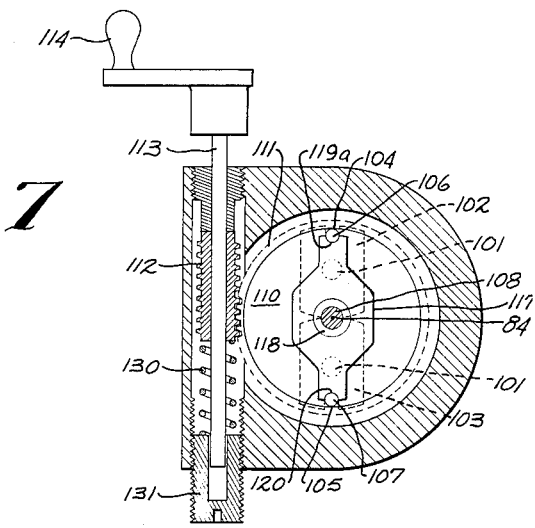
Figure 8:
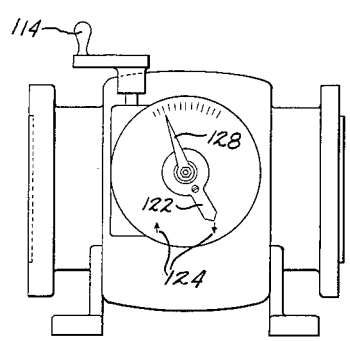

Control means is provided for varying the speed ratio and for initiating the precessing function. Referring, now, to FIGS. 6 and 7, the body-portion 91 is bored to receive a pair of pins 101 lying in the plane of FIG. 6. There is provided a pair of precess levers 102 and 103 arranged to pivot intermediate the ends thereof about pins 101 in the plane of FIG. 7. The outer ends of the precess levers 102 and 103 are slotted as shown by numerals 104 and 105 to receive pins 106 and 107, respectively. These pins are free to be moved into or withdrawn from the slots in the precess levers as will be described later.

The inner ends of precess levers 102 and 103 are grooved or recessed to encompass control arm 108 which is suitably secured to sleeve 93, as by a threaded connection.

If a force is applied to pin 106 in such a manner as to tend to move the pin in a counterclockwise manner as viewed in FIG. 7, lever 102 tends to pivot about upper pin 101, thereby applying a force against arm 108 for moving the arm toward the right as viewed in FIG. 7. There results a precessing action which causes carrier 78 to rotate normal to the plane of FIG. 6. This counterclockwise movement, in turn, carries pivot pin 101 counterclockwise (in FIG. 7) to return arm 108 to its normal position. This is accomplished in a series of substantially instantaneous incremental adjustments.

Pins 106 and 107 are mounted for reciprocal movement through a block 110 which is mounted for limited rotational movement about arm 108 as a center. In order to rotate block 110 and thereby effect a change of speed ratio, there is provided a worm gear 111 attached in suitable fashion to block 110 or integral therewith, a worm 112 mounted on a shaft 113, and an adjustment knob or handle 114.

A drive of the type shown is capable of rotation in either direction. Means is provided for accommodating the above-described control means to one direction of rotation or the other. In order to enable control in the reverse direction from that shown, means is provided to withdraw pin 106 from slot 104 and insert pin 107 into slot 105. Pin 106 is provided with a circumferential groove 115 near its outer end and pin 107 is arranged with a similar groove 116. There is provided a rocking lever 117 having a central opening 118 through which arm 108 extends and at its outer ends a pair of arms slotted as indicated by numerals 119 and 120 which enclose pins 106 and 107, respectively, in grooves 115 and 116. The face of block 110 on which rocker lever 117 rides is conical so that the lever may pivot about its center (corresponding to axis 84). Thus, pivotal movement of lever 117 in a clockwise direction in FIG. 6 removes pin 106 from engagement with lever 102 and moves pin 107 into engagement with lever 103.

In order to enable a change of direction, there is provided a plate 118a having a cam portion 19a so dimensioned as to accomplish the above-described action as plate 118a is rotated about its center within an opening 121 in cover 121a of housing 73. On the outer face of plate 118a, there is attached a control arm 122 as by means of screw 123. Stops (not shown) may be employed to limit this rotation and indicia 124 may be used to indicate the correct rotational settings.

The cam will have ramps to effect the desired changes and flat portions between the ramps which are long enough circumferentially to keep lever 117 in the correct position to hold the appropriate pin in place during speed ratio changes.

It will be noted in FIG. 6 that plate 118a has an opening 125 through which arm 108 extends. The clearance between the plate and the control arm determines the maximum amount of precessing tilt or movement. Means is provided for enabling the prevention of any precessing, even under load. For this purpose, there is provided a knob 126, mounted for reciprocation along arm 108. The knob is provided with a projection 127 which may move axially into opening 125. The worm gear arrangement substantially locks plate 110 and pins 106 and 107. Knob 126 may be provided with a window or opening (not shown) to provide clearance for a pointer 128 mounted on arm 108 but pointer 128 and knob 126 are independent.

The limited precess described above is advantageous in that, if the unit is set up incorrectly, the device will not be harmed but will flight response in the wrong direction.

When an increase in load occurs, force is applied through arm 108 to the precess levers and pin 106 or 107 and finally to the worm gear set. Worm 112 may be backed up by suitable resilient means, such, for example, as compression spring 130. With this arrangement, as the load increases, worm wheel 111 tends to rotate which tends to move worm 112 axially against spring 130. The spring is chosen of strength to support the normal load and to compress if this load is exceeded. Means may be provided to permit adjustment of spring tension. For example, a threaded plug 131 may be used. While I have shown a worm gear set and spring back up means, the specific embodiment shown is exemplary only. The function performed is to provide yieldable means, such as spring 130, or fluid pressure such as oil or air, for example, acting together with the force developed at the precess arms or levers to balance changes in tangential force.

What I claim is:

1. In a motion transmitting device having driving and driven discs, means engaging corresponding faces of said discs for transmitting motion from the driving to the driven disc, said means comprising two rotatable members, means for urging apart said members and for causing them to engage the respective adjacent faces of said discs, anti-friction means for both axial and rotational movement of said members, means for carrying said members in operative position, means for pivotally supporting said carrying means whereby precessing of said members may take place, and means for causing said members to precess, the last-mentioned means comprising an arm extending from said carrying means and means for applying an external force to said arm in a direction to move said arm in a direction to move said engaging means for a new speed-ratio position.

2. In a motion transmitting device having driving and driven discs, means engaging corresponding faces of said discs for transmitting motion from the driving to the driven disc, said means comprising a first member having an outer disc-engaging portion and an inwardly extending body portion, said last mentioned portion having a longitudinally extending opening and a second member having an outer disc-engaging portion and an inwardly-extending body portion, the last mentioned portion extending into said opening, means for urging apart said members into engagement with the corresponding discs, and anti-friction means disposed between said inwardly extending portions.

3. The device of claim 2 in which said anti-friction means comprises a plurality of balls, thereby providing substantially friction free axial and rotatable movement of said members.

4. In a motion transmitting device having axially aligned driving and driven discs, means engaging adjacent faces of said discs for transmitting motion between said discs, said means comprising a carrier pivotally mounted between said faces on an axis normal to the common axis of said discs, said carrier having an eccentrically disposed opening therethrough transversely of said pivotal axis, a cylindrical member disposed in said opening and having a second eccentrically disposed opening therethrough, an anti-friction bearing lining the last-mentioned opening, a cylindrical sleeve disposed within the opening defined by said bearing, a first member having an outer disc engaging portion and an inner body portion, said first member having a longitudinally extending opening, a second member, said second member having an outer disc engaging portion and an inner body portion extending into said opening, a plurality of ball bearings disposed in the space between said inner body portions, both of said inner body portions extending into said sleeve, and a plurality of ball bearings disposed in the space between said sleeve and one of said inner body portions.

5. In a motion transmitting device having driving and driven discs, means engaging corresponding faces of said discs for transmitting motion from the driving to the driven disc, said means comprising two rotatable axially-aligned members, each having an outer disc-engaging portion and an inwardly extending body portion, said body portions having axially-aligned openings at their adjacent ends, means for urging apart said members into disc engagement, the last-mentioned means including cam means, means for maintaining said cam means in operative position, said maintaining means having portions projecting into said openings for maintaining axial alignment of said members.

6. The device of claim 5 together with means for carrying said members comprising a carrier, said carrier having an opening therethrough, said members extending into said opening and coaxial therewith, and anti-friction means within said opening and between said members and said carrier, said anti-friction means being effective for both axial movement and rotation of said members.

7. The device of claim 6 in which said anti-friction means comprises a plurality of balls, and means is provided for positioning said balls for movement in a helical pattern whereby the balls do not track on a common path.

8. In a motion transmitting device having driving and driven discs, means engaging corresponding faces of said discs for transmitting motion between said discs, said means comprising two rotatable members, means for urging said members into engagement with the respective faces, means for carrying said members in operative position, means for pivotally supporting said carrying means whereby precessing of said members may take place, and means for causing said members to precess, the last-mentioned means comprising an arm extending from said carrying means and means for applying an external force to said arm in a direction to move said arm in a direction to move said engaging means to a new speed-ratio position.

9. The device of claim 8 in which means is provided for permitting rotation of the driving disc in either direction of rotation.

10. The device of claim 8 in which means is provided for selectively rendering ineffective said external force, whereby ratio change may be prevented.

11. The device of claim 8 provided with means for selectively preventing movement of said engaging means.

12. The device of claim 8 and means for selectively positioning said precess causing means according to the directions of rotations of said discs.

13. In a motion transmitting device of the type having driving and driven discs and roller means engaging said discs for transmitting motion between said discs and pivotal means comprising a pair of arms for supporting said roller means whereby the points of engagement between said roller means and said discs and, therefore, the speed-ratio between said discs may be varied by causing pivotal movement of said pivotal means, means for causing said pivotal movement comprising one of said arms, a cross-arm carried by said one arm, and means for rotating said cross-arm.

14. The device of claim 13 provided with means for selectively preventing rotation of said cross-arm.

15. In a motion transmitting device of the type having driving and driven discs and roller means engaging said discs for transmitting motion between said discs and pivotal means comprising a pair of arms for supporting said roller means whereby the points of engagement between said roller means and said discs and, therefore, the speed-ratio between said discs may be varied by causing pivotal movement of said pivotal means, means for causing said pivotal movement comprising one of said arms, a cross-arm carried by said one arm, a slide carrier, a slide member carried by said carrier and arranged for engagement with said cross-arm, and means for rotating said slide carrier, whereby said slide member, said cross-arm, and said arm are caused to rotate.

16. The device of claim 15 provided with means for moving said slide member to one of two positions on opposite sides of the centerline of said arm according to the directions of rotation of said discs.

17. The device of claim 15 and means for selectively positioning said slide carrier according to the directions of rotation of said discs.

18. The device of claim 15 provided with means for selectively positioning said slide carrier according to the directions of rotation of said discs, and means for selectively preventing the change of position of said slide carrier.

19. In a motion transmitting device of the type having driving and driven discs and roller means engaging said discs for transmitting motion between said discs and pivotal means for supporting said roller means whereby the points of engagement between said roller means and said discs and, therefore, the speed-ratio between said discs may be varied by causing pivotal movement of said pivotal means, means for permitting precessing of said engaging means comprising an arm extending from said pivotal means a pair of precess levers diametrically arranged with respect to said arm, adjacent ends of said levers being recessed to encompass closely said arm, means intermediate the ends of said levers for enabling pivotal movement thereabout, the opposite ends of said levers being recessed, a pair of reciprocable pins, means for selectively moving one of said pins into one of said recessed opposite ends, and means utilizing said one pin for tending to cause the associated lever to pivot about said intermediate means whereby said associated lever tends to move laterally said arm and thereby causes precessing of said engaging means.

20. The device of claim 19 in which said selective moving means comprises a rocking lever arranged for pivotal movement, said rocking lever engaging said pins at opposite ends thereof, and means for selectively causing the last mentioned lever to pivot whereby said pins are reciprocably moved in opposite directions.

21. The device of claim 19 provided with means for preventing precession of said engaging means, said means comprising a plate, said plate having an opening therein, said arm extending through said opening whereby the clearance between said plate and said arm determines the maximum amount of precessing, and means movable into the resulting space between said arm and said plate for closing said space and eliminating said clearance.

22. The device of claim 19 in which said selective moving means comprises a block having a conical face, said block having openings for reciprocably receiving said pins, and an opening through which said arm extends, a rocking lever mounted for pivotal movement about said arm on said conical face, and means for causing said rocking lever to pivot on said face whereby one of said pins is moved into engagement with its associated precess lever and the other of said pins is withdrawn from engagement with its associated lever.

23. The device of claim 22 in which said pivot causing means includes a cam plate having a cam portion and means for moving said plate for causing said portion to apply a pivoting force to said rocking lever.

24. The device of claim 22 in which the opening through which said arm extends is large enough to permit lateral motion of said arm with respect to said block.

References Cited by the Examiner
FOREIGN PATENTS 1,034,814  4/1953  France.
812,618    9/1951  Germany.

MILTON KAUFMAN, *Primary Examiner.*

BROUGHTON DURHAM, *Examiner.*

T. W. SHEAR, P. W. SULLIVAN, *Assistant Examiners.*